L. MORGAN.
Method of Casting.
No. 8,878. Reissued Sept. 2, 1879.
FIG. I.
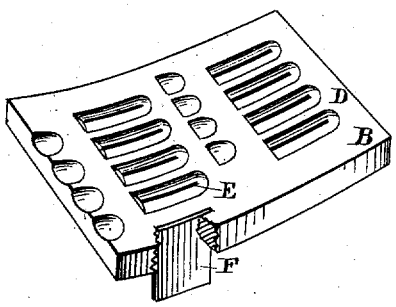
FIG. II.
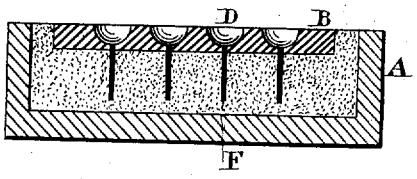
FIG. III.
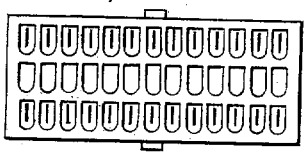
ATTEST:
Alex. Scott
INVENTOR:
Lyman Morgan
by F. M. Ritter Jr.
Associate atty
N. PETERS, PHOTO-LITHOGRAPHER, WASHINGTON, D. C.

UNITED STATES PATENT OFFICE.

LYMAN MORGAN, OF OZAUKEE, WISCONSIN.

IMPROVEMENT IN METHODS OF CASTING.

Specification forming part of Letters Patent No. 164,198, dated June 8, 1875; Reissue No. 8,878, dated September 2, 1879; application filed June 17, 1879.

*To all whom it may concern:*

Be it known that I, LYMAN MORGAN, of the town and county of Ozaukee, State of Wisconsin, have invented certain new and useful Improvements in Casting Staves for Smut-Mills; and I do hereby declare the following to be a full, clear, and exact description thereof, reference being had to the accompanying drawings, in which—

Figure 1 is a perspective view of the pattern used in casting the staves of smutter-machine cases as invented by me; and Fig. 2 is a cross-section of the lower half of a flask with the pattern in place. Fig. 3 represents one form of stave.

My invention relates to a method of casting staves for smutter-cases, and its nature will be hereinafter more fully described.

The interior of a smutter-case should be provided with indentations, while the outside should be smooth, and the oblong holes or slots come up flush with the outside of the case, so that if the grain wears the inside of the case the holes for the escape of dust will maintain their size, and will be no larger than when the case is new or unworn. To this end I propose to chill the slots by means of chill-cores in the mold at the time of casting.

In the drawings, B indicates the stave-pattern, having indentations D and oblong holes E, and in other respects corresponding to the stave to be produced, due allowance being made for shrinkage common to all castings.

A indicates the drag, and F the chills employed.

In preparing the mold I fill the drag A with sand in the usual manner, and embed the pattern B therein, with the convex face down, tamping the molding-sand around even with the top of the pattern. I then stick the chill-cores F through the oblong holes E of the pattern B, forcing them down into the sand in the drag until their tops are flush with the bottom of the indentations D. The cope is then applied, and the sand packed on top of the pattern and tamped in the usual manner, a gate being formed, thus making the necessary provision for pouring the metal into the mold. The cope or top of the flask is then removed, together with its contents, and the pattern B drawn from the sand in the drag, leaving the chill-cores F sticking up in the mold, so that when the cope or top of the flask is replaced it will form a mold with the chill-cores in place. The casting may then be done in the usual manner, and the cores will make the oblong openings in the stave, chilling the metal at the margin thereof. The cope is finally removed, the casting withdrawn, and the cores pulled out of the stave.

The staves thus produced will be smooth on the convex or outside, and have chilled slots that resist frictional wear, while the inner or concave side will have oblong indentations, which catch the grain as it is thrown out by the beaters of a mill, and scour it from end to end without breaking it.

Having thus described my invention, what I claim, and desire to secure by Letters Patent, is—

The method of forming molds for staves of smut-machines, which consists in embedding the pattern in the sand, sticking the chill-cores through the pattern into the sand, and drawing the pattern off from the chill-cores, leaving them in place in the sand, substantially as described.

In testimony that I claim the foregoing as my own I affix my signature in presence of two witnesses.

LYMAN MORGAN.

In presence of—
E. H. BOTTUM,
S. S. STOUT.